Nov. 15, 1949     S. L. MADORSKY     2,488,474
PREPARATION OF ANHYDROUS MAGNESIUM CHLORIDE AND
RECOVERY OF METALLIC MAGNESIUM
Filed May 27, 1946     2 Sheets-Sheet 2
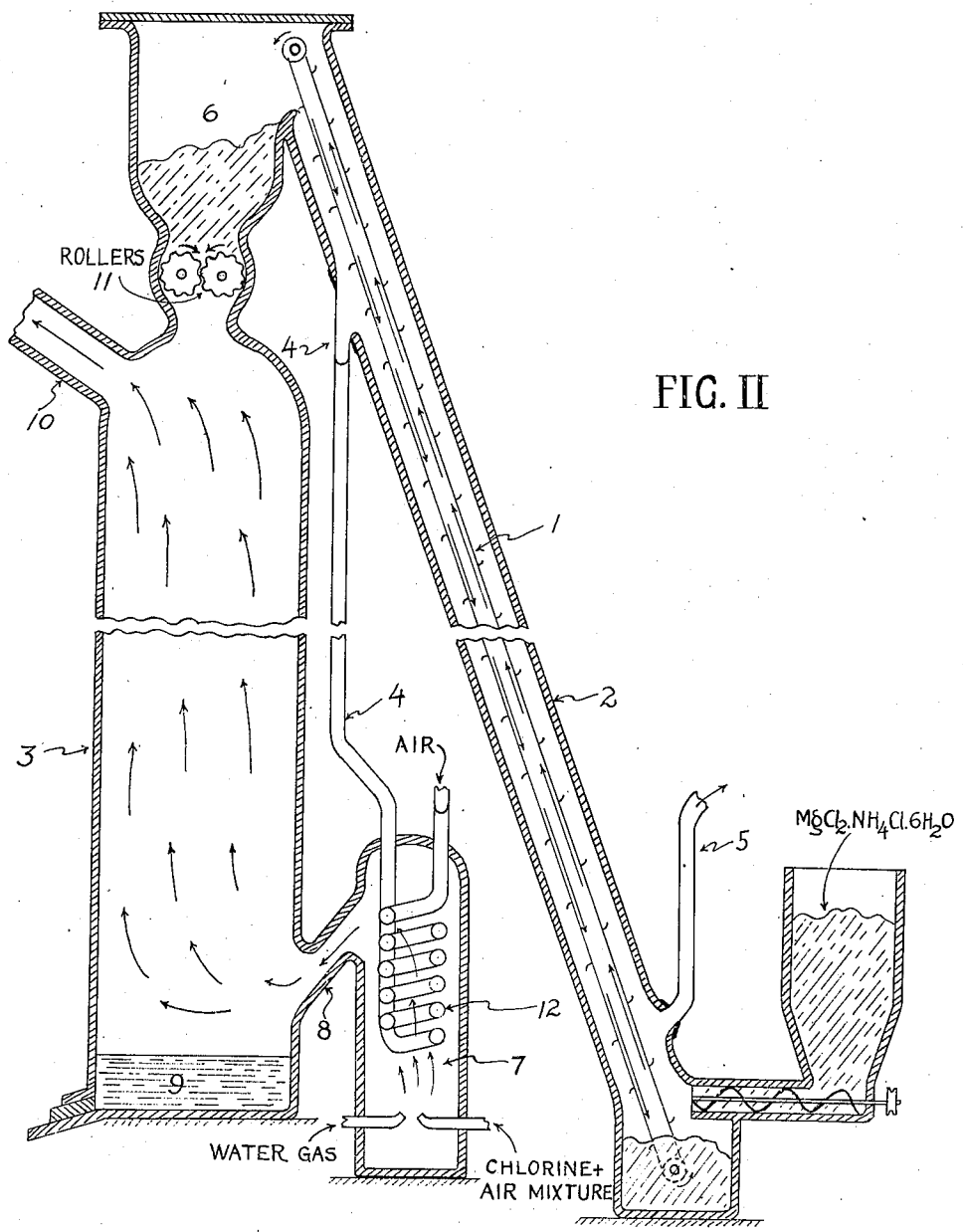
FIG. II Patented Nov. 15, 1949

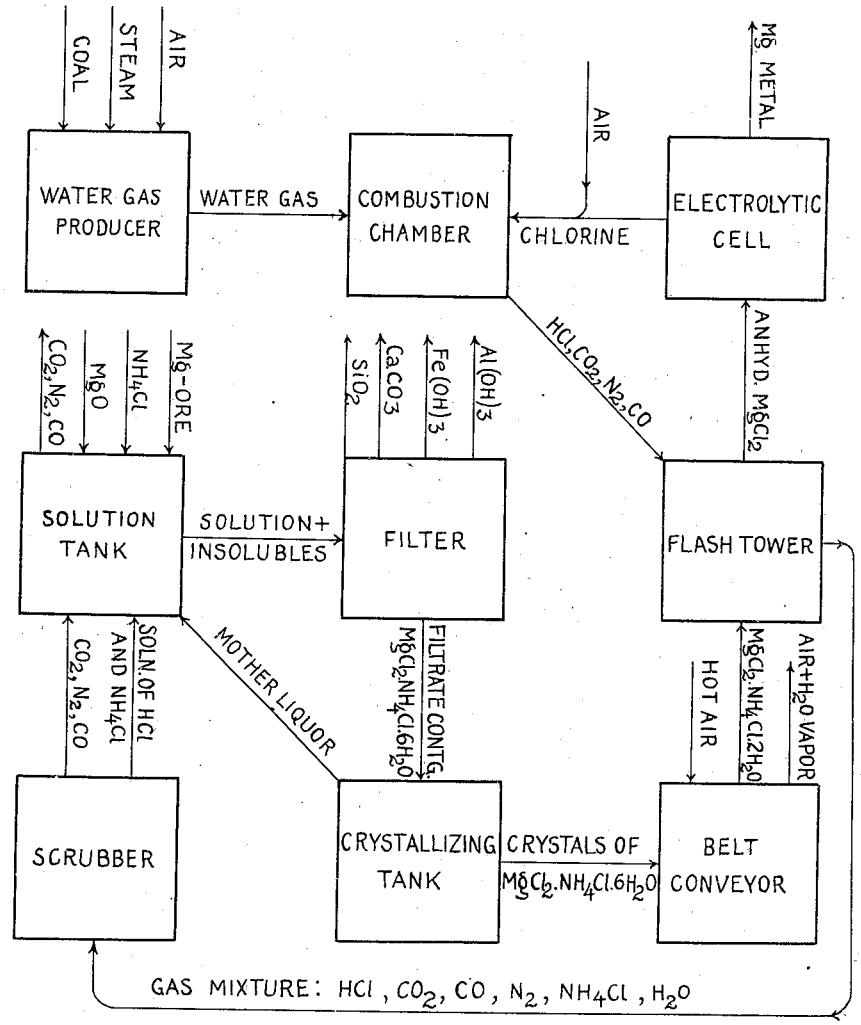
FIG. I

2,488,474

UNITED STATES PATENT OFFICE 2,488,474

PREPARATION OF ANHYDROUS MAGNESIUM CHLORIDE AND RECOVERY OF METALLIC MAGNESIUM

Samuel L. Madorsky, Washington, D. C.

Application May 27, 1946, Serial No. 672,538

7 Claims. (Cl. 23—91)

The present invention relates to the recovery of metallic magnesium from magnesium bearing ores. More particularly it relates to the preparation of anhydrous magnesium chloride from such ores, and to the utilization of such anhydrous magnesium chloride in the preparation of metallic magnesium by the electrolytic method.

At the present time, metallic magnesium is produced primarily by the electrolysis in a fused bath of magnesium chloride. In the existing electrolytic methods of producing magnesium, the bath feed consists in most cases of partially hydrated magnesium chloride instead of the anhydrous salt. The reason for this lies in the fact that complete dehydration of $MgCl_2.6H_2O$ is a protracted, laborious, difficult and costly process.

Magnesium chloride is usually obtained in hydrated form either from brines derived from underground salt deposits, or from sea water. In the case of brines, which are complex mixtures of various chlorides, the magnesium chloride is recovered as the hexahydrate ($MgCl_2.6H_2O$). The hexahydrate is then further dehydrated, first to the tetrahydrate and finally to $MgCl_2.1.25H_2O$ in a series of drying steps conducted in a countercurrent manner in the presence of hot air or air combustion gas mixtures. The first four molecules of $H_2O$ can be removed from the $MgCl_2.6H_2O$ by slowly heating the salt in a stream of hot air under carefully controlled temperature conditions. The $MgCl_2.4H_2O$ can be further dried to $MgCl_2$ in a stream of hot dry hydrogen chloride by circulating the gas through or over the salt. Both of these steps are slow and difficult, particularly the second step, which involves drying the gaseous hydrogen chloride for recirculation.

In recovery from sea water, magnesium is precipitated as $Mg(OH)_2$ by means of calcined lime, converted to $MgCl_2.6H_2O$ by solution in hydrochloric acid, and then dried further to $$MgCl_2.1.25H_2O$$

in the manner generally used for the hexahydrate from brines. The present practice to dry the hexahydrate is by feeding it in flaky form into a shelf drier consisting of a number of shelves, counter-current to a stream of dry, warm air. The flakes are moved from the top to the bottom of the apparatus by plowing it from shelf to shelf in a period of several hours. The product thus obtained is $MgCl_2.1.25H_2O$ and contains 75% $MgCl_2$, 1 to 3% MgO and the rest $H_2O$.

Thus by conventional methods it is not economical or practical to prepare anhydrous magnesium chloride at a cost suitably low to manufacture magnesium by electrolysis. The presence of water of hydration is objectionable in the conventional drying process as well as electrolysis due to the fact that at high temperatures magnesium oxide tends to form through the reaction.

(1) 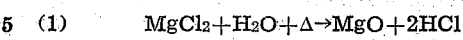  $MgCl_2 + H_2O + \Delta \rightarrow MgO + 2HCl$

The presence of MgO in the cell feed causes mechanical difficulties since it settles to the bottom and accumulates with the result that cell operation must be suspended to permit removal, or other provision must be made for getting the oxide out.

The decomposition of $MgCl_2$, in addition to depositing MgO in the cell, also liberates HCl which complicates corrosion difficulties within the cell, and causes considerable loss of current due to electrolysis of the HCl into $H_2$ and $Cl_2$. Furthermore some of the MgO formed in the decomposition reacts with the chlorine, and carbon from the electrode, as follows:

(2) 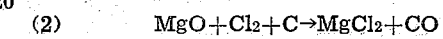  $MgO + Cl_2 + C \rightarrow MgCl_2 + CO$ thus increasing cost of operation by accelerating decomposition of the graphite anode. In general, therefore, anhydrous $MgCl_2$ is a much more desirable feed than the partially hydrated chloride now commonly used and gives smoother and more efficient operation of the cell. In addition, the large amount of heat absorbed in the evaporation of the water of hydration cools the cell and requires external heating which is an additional cost factor, while the presence of water also causes oxidation and dispersion of the deposited metallic magnesium, thus reducing yield and rendering complete recovery more difficult.

While preparation and use of the anhydrous $MgCl_2$ has been practiced by others in the past, their methods of preparing the chloride in this form have been expensive and impractical. For example, preparation of anhydrous $MgCl_2$ from the hexahydrate by dehydration in a stream of dry HCl has been practiced, but this method is not generally used due to expense and other difficulties. In my prior Patent 2,165,284, dated July 11, 1939, I have described a method for the preparation of anhydrous magnesium chloride from hydrated magnesium ammonium chloride by first completely dehydrating the salt to form anhydrous magnesium ammonium chloride, and then decomposing the resulting anhydrous double salt in an atmosphere containing a small proportion of hydrogen chloride.

It is an object of the present invention to provide an improved method for preparing anhydrous magnesium chloride. It is a further object of the present invention to provide a novel method for the recovery and dehydration of magnesium chloride using magnesium bearing ores and minerals as starting materials. It is a still further object of the present invention to provide a cyclic process for the preparation of metallic magnesium from its ores.

In accordance with the present invention, completely anhydrous magnesium chloride is utilized as feed to the electrolytic step and the method which is utilized for preparing the anhydrous magnesium chloride eliminates and avoids all the difficulties heretofore involved in the preparation of this salt from $MgCl_2.6H_2O$. I have found that in a sequence of steps starting with the formation of magnesium ammonium carnallite

from magnesium bearing ores, I can obtain anhydrous $MgCl_2$ economically and effectively. In performing these steps, the magnesium bearing ore is dissolved in hydrochloric acid and pure magnesium ammonium chloride hexahydrate is obtained by precipitation. This salt is then partially dried and the partly dehydrated salt is then simultaneously decomposed to liberate $NH_4Cl$ and dehydrated in a "flash" operation carried out in a manner to be further described below. The anhydrous magnesium chloride thus obtained may then be electrolysed in a fused bath in the conventional manner to obtain metallic magnesium. Liberated chlorine and ammonium chloride are reused in the process in a novel cyclic manner. Ores which may be utilized in the present process include any of those which contain substantial proportions of magnesium, such as magnesite, brucite, dolomite, as well as magnesium silicate ores, such as olivine $(MgFe)_2SiO_4$.

In the drawings, Figure I is a flowsheet of a complete cyclic process describing the steps of the present invention. Figure II is a drawing showing in cross section a specific arrangement for carrying out the dehydration step of the invention.

My process will be discussed more particularly by a description of the successive steps thereof which are illustrated in the flowsheet as shown in Figure I, as follows:

*Step I*

Magnesium bearing ore, such as magnesite $(MgCO_3)$ is crushed to a small grain size and dissolved in hydrochloric acid of any desired concentration say 20%, preferably with the application of heat to say, 100° C. or higher. A sufficient amount of ammonium chloride $(NH_4Cl)$ is then added to the solution to convert the magnesium chloride to the double salt or carnallite, magnesium ammonium chloride hexahydrate

by the following chemical reaction:

(3) $MgCO_3 + 2HCl + NH_4Cl + 5H_2O \rightarrow$
$MgCl_2.NH_4Cl.6H_2O + CO_2$ Magnesite ordinarily contains impurities such as Ca, Fe, Al and $SiO_2$. The first three of these impurities react with the hydrochloric acid to form $CaCl_2$, $FeCl_3$ and $AlCl_3$, while $SiO_2$ remains in the insoluble form. Stoichiometric amounts of magnesium oxide or hydroxide and $NH_4Cl$ are then introduced into the solution and a stream of $CO_2$ is passed through the solution. These cause the calcium to precipitate as calcium carbonate and the iron and aluminum as ferric and aluminum hydroxides, while the magnesium of the magnesium oxide is converted into magnesium ammonium chloride hexahydrate. The reactions involved can be expressed by the following chemical equations:

(4) $CaCl_2 + MgO + CO_2 + NH_4Cl + 6H_2O \rightarrow$
$MgCl_2.NH_4Cl.6H_2O + CaCO_3$ (5) $2FeCl_3 + 3MgO + 3NH_4Cl + 21H_2O \rightarrow$
$3MgCl_2.NH_4Cl.6H_2O + 2Fe(OH)_3$ (6) $2AlCl_3 + 3MgO + 3NH_4Cl + 21H_2O \rightarrow$
$3MgCl_2.NH_4Cl.6H_2O + 2Al(OH)_3$ In case the iron in the ore is in ferrous state, as, for example, in olivine, precipitation of $Fe(OH)_2$ by means of MgO or $Mg(OH)_2$ is difficult and incomplete. In this case the $FeCl_2$ is converted into $FeCl_3$ by introducing into the solution a stream of chlorine before the step of precipitating the impurities with MgO or $Mg(OH)_2$. Calcined dolomite may be substituted for MgO or $Mg(OH)_2$, since the Mg in the dolomite dissolves in preference to Ca in the presence of $CO_2$. A hot liquor containing $MgCl_2.NH_4Cl.6H_2O$ in solution and $CaCO_3$, $Fe(OH)_3$, $Al(OH)_3$ and $SiO_2$ in insoluble form is obtained. The solution is filtered while hot and the hot filtrate allowed to cool. Since the solubility of ammonium magnesium carnallite is about 65% at 100° C. and only about 17% at ordinary temperatures, the bulk of the magnesium ammonium chloride hexahydrate separates out in crystalline form. The crystals are separated from the mother liquor by decantation or similar means and the mother liquor returned to the next batch of magnesite being dissolved with hydrochloric acid. The crystalline double salt is used in the next step of the process.

As an alternative to the above procedure I may dissolve the magnesium ore in hydrochloric acid, add to the solution at this stage only a fraction of the total amount of $NH_4Cl$ required, proceed with the steps of precipitating impurities and filtering the hot solution, as described above, then add to the hot filtrate the remainder of the $NH_4Cl$ required and cool the solution in order to crystallize the double salt $MgCl_2.NH_4Cl.6H_2O$.

*Step II*

The $MgCl_2.NH_4Cl.6H_2O$ obtained in Step I is carried up by means of a belt conveyor 1 as shown in Figure II enclosed in a conduit 2, to the top of a flash tower 3. Hot air is introduced into the tube through duct 4 in counter-current to the movement of the conveyor, in order to dry the salt and to dehydrate it partially. The air may be heated by introducing it into coil 12 where it is heated by combustion in zone 7. At the same time the air so circulated serves to reduce the temperature of the products of combustion to a desired level for introduction into the flash tower. The gaseous stream is maintained at a temperature somewhat below 200° C. preferably between about 175° and 200° C. It leaves the tube through duct 5 carrying away water vapor and is discarded. This preliminary drying step may be performed in a rotary kiln or in any other conventional manner provided the drying is only partial.

The dried partially dehydrated magnesium ammonium chloride (which contains from 2 to 4 mols of $H_2O$) falls into a box 6 at the top of flash tower and is forced by means of flaking rollers 11 as a flaky material down into the flash tower. The finely divided flaky salt on its way down the tower comes in intimate contact with a hot gaseous stream moving in countercurrent direction to it. This gaseous stream is formed by the combustion of a mixture of chlorine and air with water gas (CO + H₂) or similar gas in a combustion chamber 7 near the bottom of the tower. It enters at a temperature of about 800° to 1000° C. into the tower through duct 8 and consists of a mixture of HCl, CO₂, N₂, and some CO. This gaseous stream serves to vaporize from the descending flakes of partially dehydrated magnesium ammonium chloride, the water of hydration and the ammonium chloride, leaving behind anhydrous magnesium chloride. The anhydrous magnesium chloride collects at the bottom of the flash tower in a receptacle 9 either in solid or fused condition and is used further in Step III of the process. The partially dehydrated magnesium ammonium chloride may of course be introduced in crushed or granulated form rather than as flakes, or in any desired state of comminution which will permit the flash drying operation to be carried out.

The gaseous stream leaves the tower through duct 10 loaded with vapors of NH₄Cl and H₂O. The temperature of this gas stream is maintained at about 300° to 350° C., or above, in order to maintain the NH₄Cl in gaseous state. It is scrubbed with water to dissolve its NH₄Cl and HCl content.

In the event the gas stream contains an excess of NH₄Cl over the amount desired in the leaching step, a portion of the vaporized salt may be removed from the stream by condensation and the condensed salt can be utilized in the preparation of the double salt. The solution of NH₄Cl and HCl is then used in Step I to dissolve a new batch of magnesite, while the scrubbed gas, still containing CO₂, is used in the preparation of impurities as described in Step I.

In the drying tower described above the flash dehydration and decomposition occurs, in effect substantially simultaneously. Actually dehydration is immediately followed by decomposition and the two results occur so quickly that the flash effect described is obtained. In the top region of the tower the partially hydrated salt encounters the hot dry gas flowing countercurrent thereto and the water of hydration is almost instantaneously removed. In the central region of the tower the anhydrous magnesium ammonium chloride encounters the hot dry gas mixture and ammonium chloride is driven off. In the bottom region of the tower the magnesium chloride is fused and is collected in the anhydrous molten state. All of the above operations actually occur within several seconds and the transition from hydrated complex salt to molten magnesium chloride is carried out so quickly in the presence of the hot, dry gas containing HCl that no opportunity for hydrolysis or other side reactions forming impurities in the MgCl₂ exists. The removal of water takes place in the top of the tower so that no moisture is present during the ammonium chloride liberation and the fusion steps. Where the temperature of the hot combustion gas is at or somewhat below the melting point of magnesium chloride, the product may be collected at the bottom of the tower in the anhydrous solid state rather than in molten condition.

In this step the MgCl₂ in the double salt is being protected by the NH₄Cl from reacting with the water of hydration while the double salt is being heated. I have discovered that the "flash" evaporation of both the water and the ammonium chloride at elevated temperatures of the order of 800° to 1000° C. is highly effective. The presence of HCl in the countercurrent gaseous stream and the relative absence of water vapor in this stream serves further to protect the MgCl₂ from any possible reaction with H₂O as can be readily seen from the chemical equation:

(8) $\quad MgCl_2 + H_2O \rightleftharpoons MgO + 2HCl$

The presence of HCl and the relative absence of H₂O in the atmosphere will drive the above reaction from right to left. Any MgO that might be formed in the upper region of the tower due to the presence of H₂O as water of hydration, will eventually be reconverted into MgCl₂ in the lower region of the tower by the HCl present in the countercurrent gaseous stream. It is thus apparent that one of the novel features of my invention consists in heating hydrated or partially hydrated MgCl₂·NH₄Cl at an elevated temperature to eliminate in one step water of hydration and ammonium chloride by vaporization to obtain anhydrous magnesium chloride.

Another novel feature of the present invention is the formation and application of a gas suitable for carrying out the step of evaporating NH₄Cl and H₂O from the hydrated or partially hydrated magnesium ammonium chloride in the flash tower or similar apparatus. This gas mixture is produced as follows:

In the combustion of a mixture of chlorine and air with water gas or similar gas in the combustion chamber 7, Figure II, the following possible reactions should be considered:

(9) $\quad Cl_2 + CO \rightarrow COCl_2$ (phosgene)
(10) $\quad H_2 + Cl_2 \rightarrow 2HCl$
(11) $\quad H_2 + \frac{1}{2}O_2 \rightarrow H_2O$
(12) $\quad H_2O + Cl_2 \rightarrow 2HCl + \frac{1}{2}O_2$
(13) $\quad CO + \frac{1}{2}O_2 \rightarrow CO_2$ Of these reactions, (9) does not take place to any appreciable extent at temperatures above 800° C. Reaction (10) takes place with evolution of a considerable amount of heat. Reaction (11) also takes place and with evolution of heat, but the H₂O thus formed will immediately react with chlorine in the reverse of Deacon's process, as in reaction (12) which is favored at high temperatures and the O₂ resulting from reaction (12) will react with CO as in reaction (13), which takes place with evolution of considerable heat.

In accordance with the present invention, I have found that by employing a water gas mixture and a chlorine-air mixture such that H₂ is present in the water gas in stoichiometric equivalent proportions to the chlorine in the chlorine-air mixture, and the CO in the water gas is in slight excess of that required for a stoichiometric reaction with the oxygen of the chlorine-air mixture, the gas resulting from combustion of such water gas with such chlorine-air mixture will be substantially free from water vapor and will consist principally of gaseous hydrogen chloride, carbon dioxide, nitrogen and some carbon monoxide, in accordance with the complete equation:

(14) $\quad Cl_2 + \frac{1}{2}O_2 + H_2 + CO + N_2 \rightarrow$
$\quad\quad\quad\quad\quad\quad 2HCl + CO_2 + CO + N_2$ In the combustion of Cl₂+air with a mixture of CO and H₂ the gaseous products will be at a temperature higher than required or desirable in the step of vaporizing NH₄Cl and H₂O in the flash tower. The temperature of the gas is lowered to about 800°–1000° centigrade by allowing it to flow in heat exchange with a portion of duct 4, Fig. II, thru which air for partial dehydration of MgCl₂.NH₄Cl.6H₂O is introduced into conduit 2. This arrangement results in an economical utilization of heat, since the heat lost by the combustion gases is utilized to partially dehydrate the ammonium carnallite by preheating the air to a desired level.

The resulting gas mixture will be at the desired temperature effective to function as a drying gas and will be substantially anhydrous to effectively prevent any decomposition of magnesium chloride. There will be no free chlorine since this has been converted to HCl, and hence free chlorine will not be recovered admixed with the water vapor removed from the salt. A slight excess of carbon monoxide is permitted in the combustion step in order to ensure removal of oxygen as $CO_2$ and in order to permit substantially complete reaction between $H_2$ and $Cl_2$ to form HCl. The slight excess of CO which remains in the gas has an additional function in that in the event any small amounts of free $Cl_2$ may remain in the combustion products, in the upper portions of the flash tower where some water vapor is present, the CO will react with chlorine to form $COCl_2$ which will immediately decompose in the reaction $COCl_2 + H_2O \rightarrow 2HCl + CO_2$, thus forming additional HCl. Free chlorine in the effluent will constitute a loss since it is little soluble in water and, therefore, not recoverable.

Step III

The anhydrous $MgCl_2$ obtained in Step II is fed into an electrolytic bath consisting of a mixture of fused salts such as $MgCl_2$, $CaCl_2$ and NaCl, and this bath is subjected to electrolysis in the usual manner. Molten magnesium metal collects at the cathode and is removed at regular intervals. Chlorine collects at the anode where it is mixed with cold air to protect the graphite electrode. The mixture of chlorine and air is recovered from the cell and used for combustion with water gas as described in Step II above.

Example

To take a specific example, 1 kg. of crushed magnesite, containing 25.45% Mg (42.20% MgO), 2.66% CaO, 3.48% $SiO_2$, 2.12% $Fe_2O_3+Al_2O_3$ and 48.5% volatile matter, is mixed with 0.42 kg. of 20% hydrochloric acid and the mixture heated to about 100° C. To this is then added 0.6 kg. $NH_4Cl$ and 0.04 kg. MgO, while a stream of $CO_2$ is passed thru the solution. This solution is filtered, while still hot, from the insoluble residue. The residue weighing about 0.11 kg. consists mainly of $CaCO_3$, $SiO_2$, $Fe(OH)_3$ and $Al(OH)_3$. The filtrate, weighing 4.95 kg. and consisting of 2.88 kg. hydrated double salt, $MgCl_2.NH_4Cl.6H_2O$, and 2.07 kg. free water of solution, is allowed to cool. On cooling to room temperature, the hydrated double salt separates out in crystalline form. The crystals are separated from the mother liquor by decantation and 2.50 kg. of the hydrated double salt is thus obtained. The mother liquor, weighing 2.45 kg. and containing 0.38 kg. of the hydrated double salt in solution, is added to the next batch of rock to be treated.

The hydrated crystalline double salt is first dried at about 180° C. to vaporize the first 3–4 molecules of water of hydration and then treated in the flash tower to vaporize the remaining water of hydration and the $NH_4Cl$ associated with the $MgCl_2$. About 0.93 kg. of anhydrous $MgCl_2$ is collected.

The anhydrous $MgCl_2$ is fed into a bath of molten salts consisting of a mixture of $MgCl_2$, NaCl and $CaCl_2$ and is electrolyzed. Conventional bath compositions and current conditions are utilized. One such bath composition consists of 25% $MgCl_2$, 60% NaCl and 15% $CaCl_2$. Metallic magnesium collects at the cathode and, being lighter than the bath, floats to the surface where it is collected at regular intervals. Chlorine collects at the anode where it is mixed with cold air and the mixture is then burned with water gas to form hydrogen chloride and other products of combustion, as described above, and used in the process in a cyclic manner.

I claim:

1. A process for the preparation of anhydrous magnesium chloride which comprises flowing hydrated magnesium ammonium chloride in intimate contact with and countercurrent to a stream of hot, dry gas comprising a minor proportion of hydrogen chloride at a temperature of at least about 800° C. thereby effecting substantially instantaneous dehydration followed by liberation of ammonium chloride, and recovering the anhydrous magnesium chloride so produced.

2. A process for the preparation of anhydrous magnesium chloride which comprises introducing relatively finely divided hydrated magnesium ammonium chloride into the top of a tower and flowing said magnesium ammonium chloride countercurrent to a stream of hot, dry gas comprising hydrogen chloride introduced at the bottom of the tower at a temperature of at least about 800° C., effecting substantially instantaneous dehydration of said hydrated magnesium ammonium chloride to produce anhydrous magnesium ammonium chloride in the top portion of the tower by contact with hot, dry gas laden with ammonium chloride vapors produced in the decomposition of the anhydrous magnesium ammonium chloride in the lower portion of the tower and recovering anhydrous magnesium chloride from the bottom of the tower.

3. A process for the production of anhydrous magnesium chloride which comprises comminuting partially hydrated magnesium ammonium chloride, dropping said partially dehydrated salt through a stream of hot, dry gas containing hydrogen chloride flowing countercurrent thereto, said dry gas stream being introduced at a temperature above the melting point of anhydrous magnesium chloride, effecting substantially instantaneous dehydration of said partially dehydrated salt to form anhydrous magnesium ammonium chloride followed by decomposition thereof to liberate ammonium chloride and form anhydrous magnesium chloride, and recovering said magnesium chloride in molten state.

4. A process for the preparation of substantially anhydrous magnesium chloride which comprises partially dehydrating magnesium ammonium chloride hexahydrate, flowing said partially dehydrated salt in countercurrent to a stream of hot gas substantially free from water introduced at a temperature of at least about 800° C. and produced by the combustion of a mixture of hydrogen and carbon monoxide with chlorine and air, the hydrogen and chlorine being present in substantially stoichiometric proportions and the carbon monoxide being present in an amount at least sufficient to react with the oxygen of the mixture, the products of said combustion being a substantially anhydrous gas mixture comprising HCl, $CO_2$, and $N_2$, and separating as a product of the dehydration substantially anhydrous magnesium chloride.

5. A process for the production of magnesium chloride which comprises dissolving a magnesium bearing ore in aqueous solution of hydrogen chloride, adding sufficient ammonium chloride to the solution of the ore to convert the dissolved magnesium chloride to magnesium ammonium chloride in solution, precipitating magnesium ammonium chloride hexahydrate from said solution, subjecting said magnesium ammonium chloride hexahydrate to partial dehydration and subjecting the resulting partially dehydrated salt to a substantially instantaneous dehydration and decomposition treatment to remove the remainder of the water of hydration and liberate ammonium chloride by flowing said partially hydrated salt in finely divided condition countercurrent to a stream of hot, dry gas containing a minor proportion of hydrogen chloride at a temperature above about 800° C., and recovering the anhydrous magnesium chloride so produced.

6. A process according to claim 5 wherein the magnesium ammonium chloride hexahydrate solution formed by the addition of ammonium chloride to the ore solution contains chlorides of calcium, iron and aluminum, and wherein magnesium oxide, carbon dioxide and additional ammonium chloride are introduced into the solution to precipitate the calcium as calcium carbonate and the iron and aluminum as hydroxides, and wherein said precipitates are separated from the solution before precipitation of the magnesium ammonium chloride hexahydrate.

7. A process according to claim 6 wherein any ferrous iron present in the solution is oxidized to ferric iron prior to precipitation of the hydroxide.

SAMUEL L. MADORSKY.

REFERENCES CITED

The following references are of record in the file of this patent:

UNITED STATES PATENTS

| Number | Name | Date |
|---|---|---|
| 2,010,756 | Genter | Aug. 6, 1935 |
| 2,165,284 | Madorsky | July 11, 1939 |

OTHER REFERENCES

Britton, "Hydrogen Ions," pub. by D. Van Nostrand, N. Y. 1929, page 278.